United States Patent
Carter et al.

(10) Patent No.: US 10,029,325 B2
(45) Date of Patent: Jul. 24, 2018

(54) METHODS AND SYSTEMS FOR ELECTROCHEMICAL MACHINING OF AN ADDITIVELY MANUFACTURED COMPONENT

(71) Applicant: GENERAL ELECTRIC COMPANY, Schenectady, NY (US)

(72) Inventors: William Thomas Carter, Galway, NY (US); John Broddus Deaton, Jr., Niskayuna, NY (US); Andrew Lee Trimmer, Niskayuna, NY (US); Michael John Fornasiero, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 453 days.

(21) Appl. No.: 14/927,611

(22) Filed: Oct. 30, 2015

(65) Prior Publication Data
US 2016/0045967 A1    Feb. 18, 2016

Related U.S. Application Data

(62) Division of application No. 13/932,799, filed on Jul. 1, 2013, now Pat. No. 9,192,999.

(51) Int. Cl.
*B23H 3/04* (2006.01)
*B33Y 80/00* (2015.01)
(Continued)

(52) U.S. Cl.
CPC ............. *B23H 3/04* (2013.01); *B22F 1/0003* (2013.01); *B22F 3/1055* (2013.01); *B22F 5/009* (2013.01); *B22F 5/04* (2013.01); *B22F 5/10* (2013.01); *B23H 3/00* (2013.01); *B23H 3/06* (2013.01); *B23H 9/00* (2013.01); *B23H 9/001* (2013.01); *B23H 9/10* (2013.01); *B23H 9/14* (2013.01);
(Continued)

(58) Field of Classification Search
CPC ............... B23H 3/04; B23H 9/00–9/18; B23H 3/00–3/10; B23H 9/10; B23H 9/14; B33Y 10/00; B33Y 40/00; B33Y 80/00; C25F 7/00
See application file for complete search history.

(56) References Cited

U.S. PATENT DOCUMENTS

2007/0256938 A1 * 11/2007 Fruth ...................... B23H 3/00
                                                                    205/668
2009/0277803 A1 * 11/2009 Wei ........................ B23H 3/00
                                                                    205/665
(Continued)

FOREIGN PATENT DOCUMENTS

WO   WO-2008058513 A1 *  5/2008 ............ B22F 3/1055
WO   WO-2014160695 A1 * 10/2014 ............ F01D 5/187

*Primary Examiner* — Nicholas A Smith
(74) *Attorney, Agent, or Firm* — GE Global Patent Operation; John Darling

(57) ABSTRACT

A system of manufacturing a component comprises forming a component on a conductive build plate. The component defines at least one access port and includes an inner surface that defines at least one internal passage. The system further includes forming at least one electrode within the at least one internal passage, wherein the at least one electrode is electrically isolated from the component. An electromotive force is applied to the at least one electrode to facilitate smoothing the inner surface.

21 Claims, 5 Drawing Sheets

(51) Int. Cl.
  *B33Y 40/00* (2015.01)
  *B33Y 10/00* (2015.01)
  *C25F 7/00* (2006.01)
  *B23H 9/10* (2006.01)
  *B23H 9/14* (2006.01)
  *B23H 3/00* (2006.01)
  *B23H 9/00* (2006.01)
  *B22F 3/105* (2006.01)
  *B22F 5/00* (2006.01)
  *B22F 5/04* (2006.01)
  *B22F 5/10* (2006.01)
  *B23K 26/342* (2014.01)
  *B22F 1/00* (2006.01)
  *B23H 3/06* (2006.01)
  *B23K 26/00* (2014.01)
  *B23K 103/04* (2006.01)
  *B23K 103/08* (2006.01)
  *B23K 103/14* (2006.01)
  *B23K 101/00* (2006.01)
  *B23K 103/18* (2006.01)
  *B22F 3/24* (2006.01)

(52) U.S. Cl.
  CPC ........ *B23K 26/0006* (2013.01); *B23K 26/342* (2015.10); *B33Y 10/00* (2014.12); *B33Y 40/00* (2014.12); *B33Y 80/00* (2014.12); *C25F 7/00* (2013.01); *B22F 2003/247* (2013.01); *B22F 2301/15* (2013.01); *B22F 2301/20* (2013.01); *B22F 2301/205* (2013.01); *B22F 2301/35* (2013.01); *B23K 2201/001* (2013.01); *B23K 2203/05* (2015.10); *B23K 2203/08* (2013.01); *B23K 2203/14* (2013.01); *B23K 2203/26* (2015.10); *Y02P 10/295* (2015.11)

(56) References Cited

U.S. PATENT DOCUMENTS

2015/0144496 A1\* 5/2015 Morris .................. F01D 5/186
  205/261
2016/0243620 A1\* 8/2016 Butcher ................. B23P 15/02

\* cited by examiner

METHODS AND SYSTEMS FOR ELECTROCHEMICAL MACHINING OF AN ADDITIVELY MANUFACTURED COMPONENT

CROSS REFERENCE TO RELATED APPLICATIONS

This application is a divisional of U.S. patent application Ser. No. 13/932,799, entitled "METHODS AND SYSTEMS FOR ELECTROCHEMICAL MACHINING OF AN ADDITIVELY MANUFACTURED COMPONENT", filed Jul. 1, 2013, which is herein incorporated by reference.

BACKGROUND

The field of the disclosure relates generally to electrochemical machining (ECM) and, more particularly, to an ECM system for use with additively manufactured components and methods of operation thereof.

Additive manufacturing is a known technology that enables the "3D-printing" of components of various materials including metals and plastics. In additive manufacturing, a part is built in a layer-by-layer manner by leveling metal powder and selectively fusing the powder using a high-power laser. After each layer, more powder is added and the laser forms the next layer, simultaneously fusing it to the prior layers to fabricate a complete component buried in a powder bed. When removed from the powder bed, the component typically has a rough surface finish that must be improved via post-build processes such as grit blasting, grinding, sanding, or polishing to meet industry standards. These processes are known to improve surface finish for external easy-to-reach surfaces of the component, but are generally insufficient for internal passages that may be present. The surface finish of internal passages must be improved to mitigate component failures due to conditions such as low-cycle fatigue, high-cycle fatigue, and coking.

ECM is a known method for improving surface finish. Due to the high metal removal rates of ECM, sufficient smoothing of surface finishes may be achieved without thermal or mechanical stresses being transferred to the component. In the ECM process, a cathode, or tool, is advanced toward an anode, or workpiece, typically the component. As ions cross a gap between cathode and the anode, material from the anode is dissolved and electrolytic fluid carries away the metal hydroxide formed in the process. ECM can be applied to the internal surfaces of an additively manufactured component. However, the complex geometry of certain components prevents the cathode from gaining access to the internal surfaces to enable them to be machined. For example, internal passages may be larger than access ports that lead to the passages, thus requiring complex movement of the cathode. Additionally, the passages may twist and turn through a complex path, requiring a flexible cathode. Furthermore, the cathode must be electrically isolated from the component to ensure successful surface finish enhancement of the internal passages using the ECM process. Moreover, the complex internal passages of the component prevent removal of the cathode after the ECM process is complete.

BRIEF DESCRIPTION

In one aspect, a method of manufacturing a component is provided. The method comprises forming a component on a conductive build plate. The component defines at least one access port and includes an inner surface that defines at least one internal passage. The method further includes forming at least one electrode within the at least one internal passage, wherein the at least one electrode is electrically isolated from the component. An electromotive force is applied to the at least one electrode to facilitate smoothing the inner surface.

In another aspect, an electrochemical system is provided. The electrochemical system comprises a support plate and a component coupled to the support plate. The component defines at least one access port and includes an inner surface that defines at least one internal passage. At least one electrode is formed within the at least one internal passage and the at least one electrode is electrically isolated from the component. A power source is coupled to the at least one electrode. The power source is configured to apply an electromotive force to the at least one electrode to facilitate smoothing the inner surface.

DRAWINGS

These and other features, aspects, and advantages of the present disclosure will become better understood when the following detailed description is read with reference to the accompanying drawings in which like characters represent like parts throughout the drawings, wherein.

Figure 1:
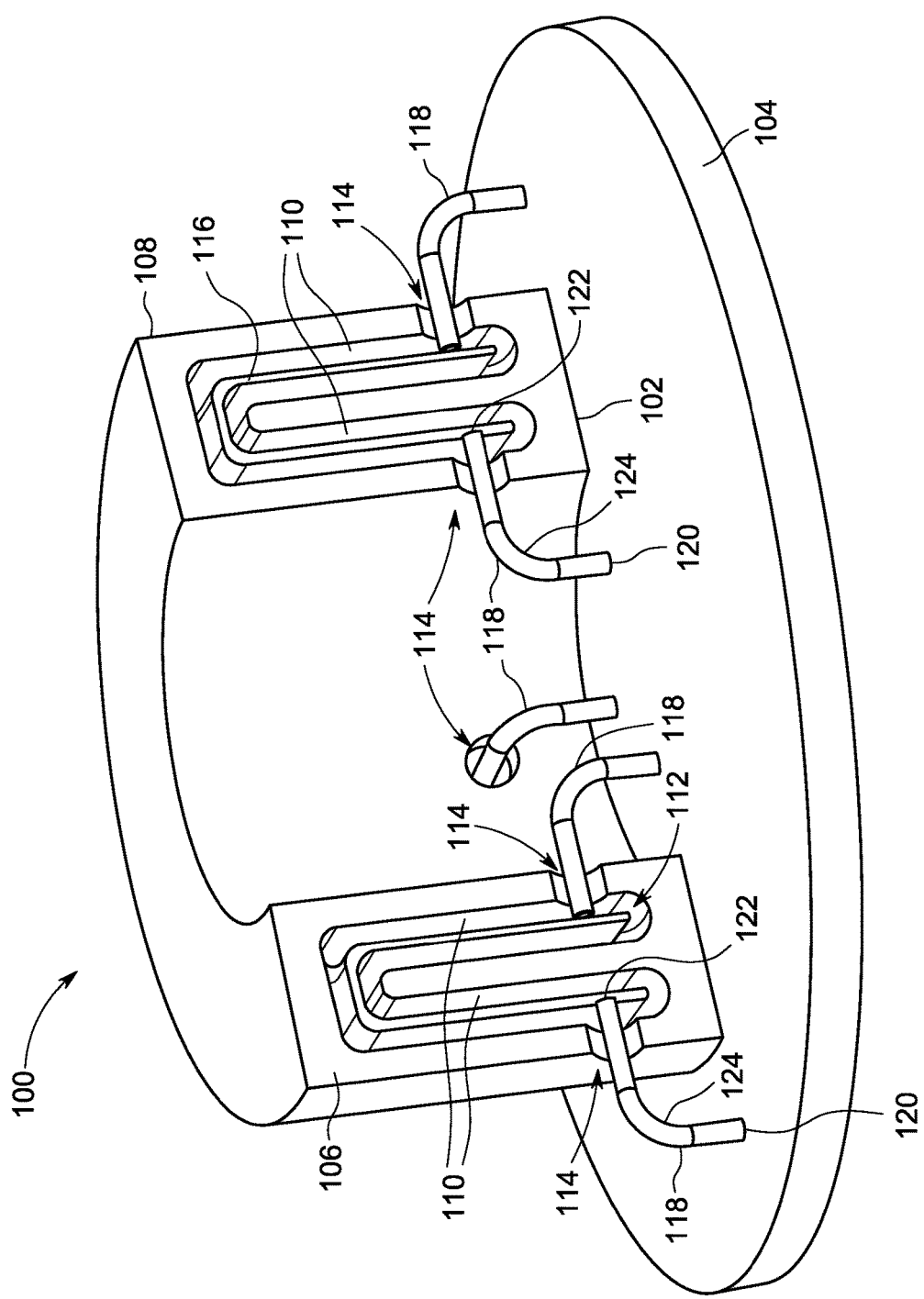
FIG. 1 is a perspective cross-sectioned view of an exemplary component manufactured by an additive manufacturing apparatus.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The additive manufacturing apparatus and ECM system described herein provide a cost-effective method for improving the surface finish of internal passages of components fabricated by additive manufacturing. The embodiments described herein facilitate the design of new components having built-in electrodes to facilitate time-efficient and cost effective ECM. Specifically, the devices, systems, and methods described herein include an additive manufacturing apparatus that simultaneously fabricates a component having internal passages and an electrode within those internal passages. After fabrication by the additive manufacturing apparatus, the electrode is electrically isolated from the component. Also, the devices, systems, and methods described herein include an ECM system that improves the rough surface finish of the internal passages as a result of additive manufacturing by causing an electrolyte to flow through the internal passages and applying an electromotive force to remove the roughness of the internal passages. Moreover, the devices, systems, and methods described herein further facilitate removal of the electrode from within the component's internal passages by reversing the polarity of the electromotive force to at least partially dissolve the electrode. The devices, systems, and methods are described herein as applied generally to any component fabricated by additive manufacturing that includes at least one internal passage requiring ECM. More specifically, the devices, systems, and methods described herein may be applied to, without limitation, fuel nozzles used in aircraft engines, fuel injectors used in gas turbine engines, and any component located within a hot gas path such as turbine blades, turbine nozzles, and bearings. Generally, the devices, systems, and methods described herein may be applied to any component where surface finish of an internal passage is critical.

FIG. 1 is a cross sectioned view of an exemplary embodiment of a component 100 manufactured using an additive manufacturing system (not shown in FIG. 1) and coupled at a component bottom surface 102 to a build plate 104. In the exemplary embodiment, component 100 may be a gas turbine fuel nozzle or a turbine rotor blade. Alternatively, component 100 may be any component that is fabricated using additive manufacturing. In the exemplary embodiment, component 100 includes a body portion 106 having an exterior surface 108. Component body portion 106 includes at least one inner surface 110 that defines at least one internal passage 112 within component 100. In the exemplary embodiment, inner surface 110 defines at least one internal passage 112 having a complex geometry within component body portion 106. Component 100 further includes at least one access port 114 that each extends through component 100 between exterior surface 108 of body portion 106 and inner surface 110 of internal passage 112. As a result, access to internal passage 112 is restricted such that access to internal passage 112 may only be gained through ports 114.

In the exemplary embodiment, an electrode 116 is within internal passage 112 of component body portion 106 between opposing inner surfaces 110. Electrode 116 is electrically isolated from and does not contact inner surfaces 110, nor any other portion of component 100. In the exemplary embodiment, electrode 116 is a solid-body electrode. Alternatively, electrode 116 may be a lattice-structured electrode. Generally, electrode 116 may have any structure that facilitates ECM operation as described herein. In the exemplary embodiment, at least one anchor 118 extends between build plate 104 and electrode 116. More specifically, each anchor 118 includes a first end 120 coupled to build plate 104, a second end 122 coupled to electrode 116, and a body portion 124 extending between first and second ends 120 and 122. Anchors 118 facilitate maintaining the position of electrode 116 within passages 112 during and after formation of component 100. Electrode 116 is anchored to build plate 104 via anchors 118 and component 100 is anchored to build plate 104 via bottom surface 102 of body portion 106. In the exemplary embodiment, body portion 124 of each anchor 118 extends through a respective access port 114 to electrode 116 such that each anchor 118 is electrically isolated from and does not contact body portion 106 of component 100.

Figure 2:
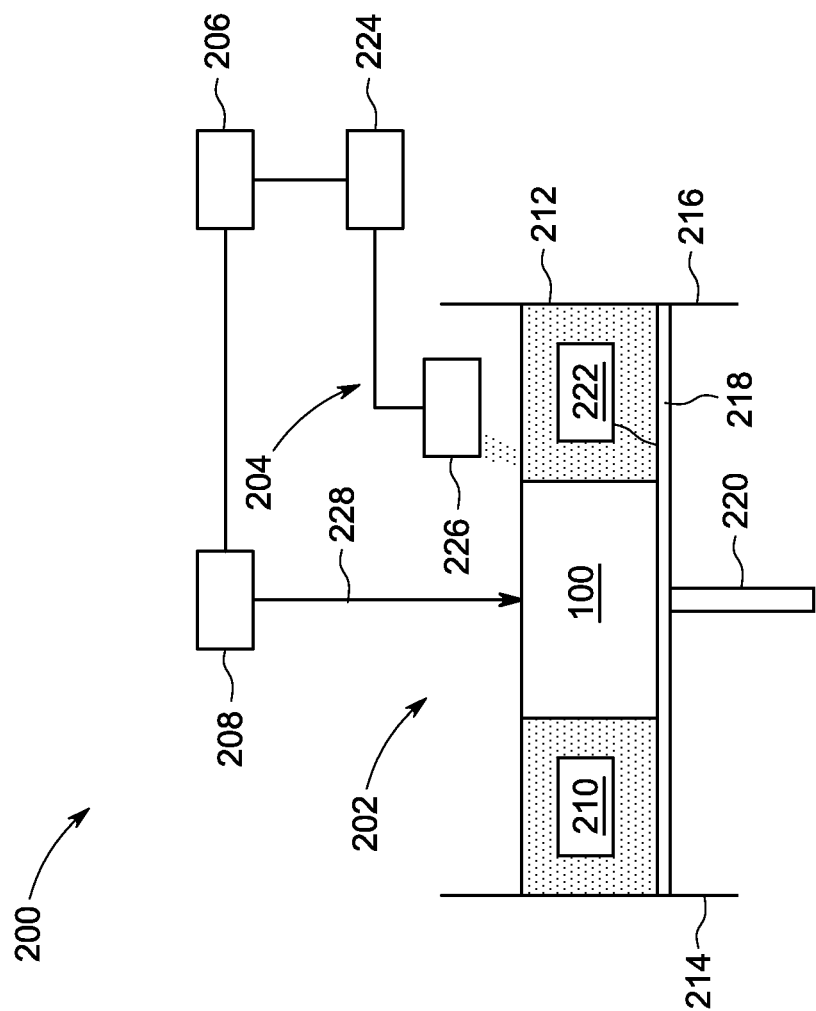
FIG. 2 is a schematic view of an exemplary additive manufacturing apparatus used to fabricate the component shown in FIG. 1.

FIG. 2 is a schematic view of an exemplary additive manufacturing system 200 used to fabricate component 100. In the exemplary embodiment, a model of component 100 is designed using computer aided design (CAD) software such that the model may include 3-dimensional coordinates of the complete formation of component 100 including body portion 106, electrode 116, and anchors 118 (all three shown in FIG. 1). Alternatively, the model may be defined in any suitable manner. The CAD model may also include a number of successive 2-dimensional cross-sectional slices that together form the 3-dimensional model. Generally, additive manufacturing provides faster material processing time, innovative joining techniques, and less concern for geometric constraints than known fabrication techniques. In one exemplary embodiment, direct metal laser melting (DMLM), also known as direct metal laser sintering (DMLS), is used to produce the additive-manufactured article, i.e., component 100. DMLM is a commercially available laser-based rapid prototyping and tooling process by which complex components may be directly produced by precision melting and solidification of metal powder into successive deposit layers of larger structures, each deposit layer corresponding to a cross-sectional deposit layer of the 3-dimensional component.

In the exemplary embodiment, system 200 is a DMLM system. Alternatively, system 200 may be any additive manufacturing system that facilitates fabricating component 100 as described herein. Additive manufacturing system 200 includes an additive manufacturing apparatus 202, a powder delivery system 204, a computer 206, and a laser 208 and functions to produce component 100 from a metal powder 210.

In the exemplary embodiment, apparatus 202 is a DMLM apparatus. Alternatively, apparatus 202 may be any additive manufacturing apparatus that facilitates fabricating component 100 as described herein. Additive manufacturing apparatus 202 includes a powder bed 212 having a first side wall 214 and an opposing second side wall 216. Additive manufacturing apparatus 202 further comprises build plate 104 that extends at least partially between first and second side walls 214 and 216 and that facilitates supporting component 100 during fabrication. A piston 220 is coupled to build plate 104 and is movable within powder bed 212 in a vertical direction along first and second side walls 214 and 216. Piston 220 is adjusted such that a top surface of build plate 104 defines a working surface 222. Powder delivery device 204 includes a powder supply 224 coupled to a powder applicator 226 that transfers powder 210 from delivery device 204 to apparatus 202. In the exemplary embodiment, powder applicator 226 is a wiper configured to distribute an even layer of powder 210 into powder bed 212. Alternatively, powder applicator 226 may be a spray nozzle that transfers powder 210 from powder supply 224 to powder bed 212. Generally, powder applicator 226 may be any device that transfers powder 210 from powder supply 224 to powder bed 212 such that system 200 operates as described herein.

During operation, powder applicator 226 distributes an even layer of powder 210 from powder supply 224 onto working surface 222 of build plate 104. Laser 208 directs a laser beam 228, which is guided by computer 206, onto working surface 222 of conductive build plate 104 to selectively fuse powder 210 into a cross-sectional layer of component 100. More specifically, laser beam 228 selectively fuses powder 210 into bottom surface 102 (shown in FIG. 1) of component 100 by rapidly melting powder 210 particles together to form a solid. As laser beam 228 continues to form a portion of each layer, heat is conducted away from the previously melted area, thereby leading to rapid cooling and solidification. In the exemplary embodiment, computer 206 controls laser beam 228 such that each layer of powder 210 will include unsintered powder and sintered powder that forms at least a portion of the cross-sectional layer of component 100.

In the exemplary embodiment, upon completion of a respective component 100 layer, build plate 104 is lowered by piston 220 and powder applicator 226 distributes an additional layer of powder 210 into powder bed 212 of additive manufacturing apparatus 202. Laser beam 228 is again controlled by computer 206 to selectively form another cross-sectional layer of component 100. This process is continued as successive cross-sectional layers are built into component 100. Each successive deposit layer of component 100 may be, for example, between 10 µm (micrometers) and 200 µm), although the thickness may be selected based on any number of parameters.

Accordingly, component 100 is fabricated beginning at bottom surface 102 such that a respective cross-sectional layer of component 100 may include at least a portion of body portion 106, electrode 116, and anchors 118. More specifically, additive manufacturing apparatus 202 facilitates simultaneously forming component body portion 106 and electrode 116 such that electrode 116 is formed within internal passage 112 (shown in FIG. 1) of component 100. Furthermore, additive manufacturing apparatus 202 facilitates simultaneously forming anchor 118 with at least one of component body portion 106 and electrode 116. In the exemplary embodiment, body portion 106, electrode 116, and anchor 118 are formed from the same material, powder 210. Alternatively, body portion 106, electrode 116, and anchor 118 may be formed from different materials such that apparatus 202 includes multiple powder delivery devices 204 that each distribute a different powder into powder bed 212 based on the component to be formed. When the additive manufacturing process is completed, any unsintered powder 210 is removed through access ports 114 (shown in FIG. 1) and component 100 is removed from powder bed 212 in anticipation of further processing.

In the exemplary embodiment, component 100 may be formed from powder 210 comprising a superalloy for example, a cobalt-based superalloy, such as cobalt-chrome, or a nickel-based superalloy, as well as high temperature stainless steels, titanium, chromium, or other alloys, or a combination thereof. Cobalt and nickel-based superalloys are most often used to fabricate gas turbine components because of the high strength required for long periods of service at the high temperatures characteristic of turbine operation. Powder 210 may be selected for enhanced strength, durability, and useful life, particularly at high temperatures. It is to be understood that for other components not subjected to high temperatures, other build materials may be used in additive-manufacturing processes as known in the art to form the first intermediate article from which the component is manufactured.

After fabrication, further processing of component 100 may be required. Such post-fabrication processing may include, for example, stress relief heat treatments, peening, polishing, hot isostatic pressing (HIP), or ECM. In some embodiments, one or more of the post-fabrication processing steps listed above are not necessary and may be omitted. In the exemplary embodiment, as a result of the additive manufacturing process, component 100 may include substantial surface roughness. Specifically, at least exterior and interior surfaces 108 and 110 (both shown in FIG. 1) may have a relatively rough surface finish and may not be suitable for use without further processing to facilitate smoothing at least exterior and inner surfaces 108 and 110.

Figure 3:
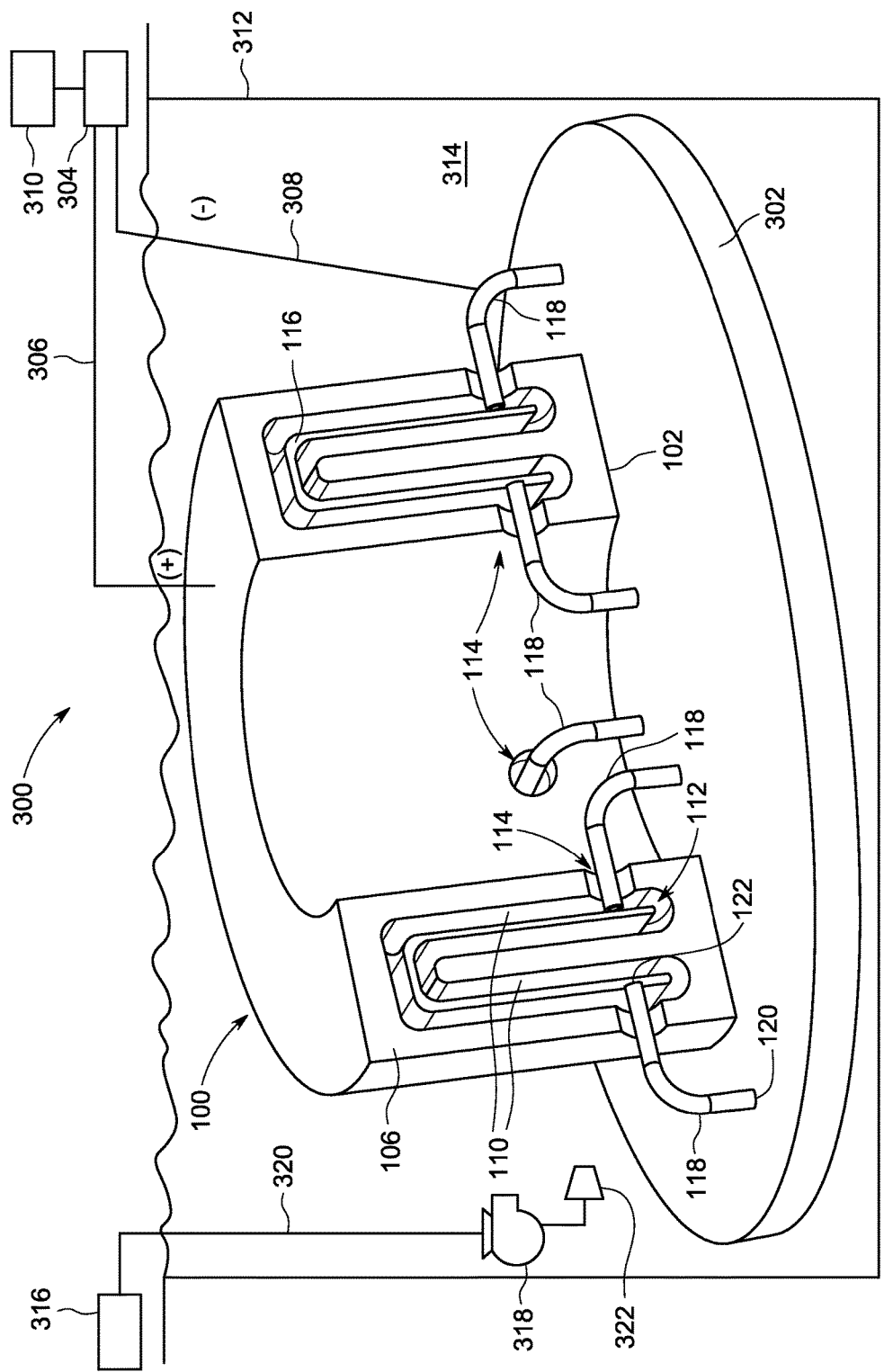
FIG. 3 is a schematic view of an exemplary electrochemical system used to machine the component shown in FIG. 1.
Figure 4:
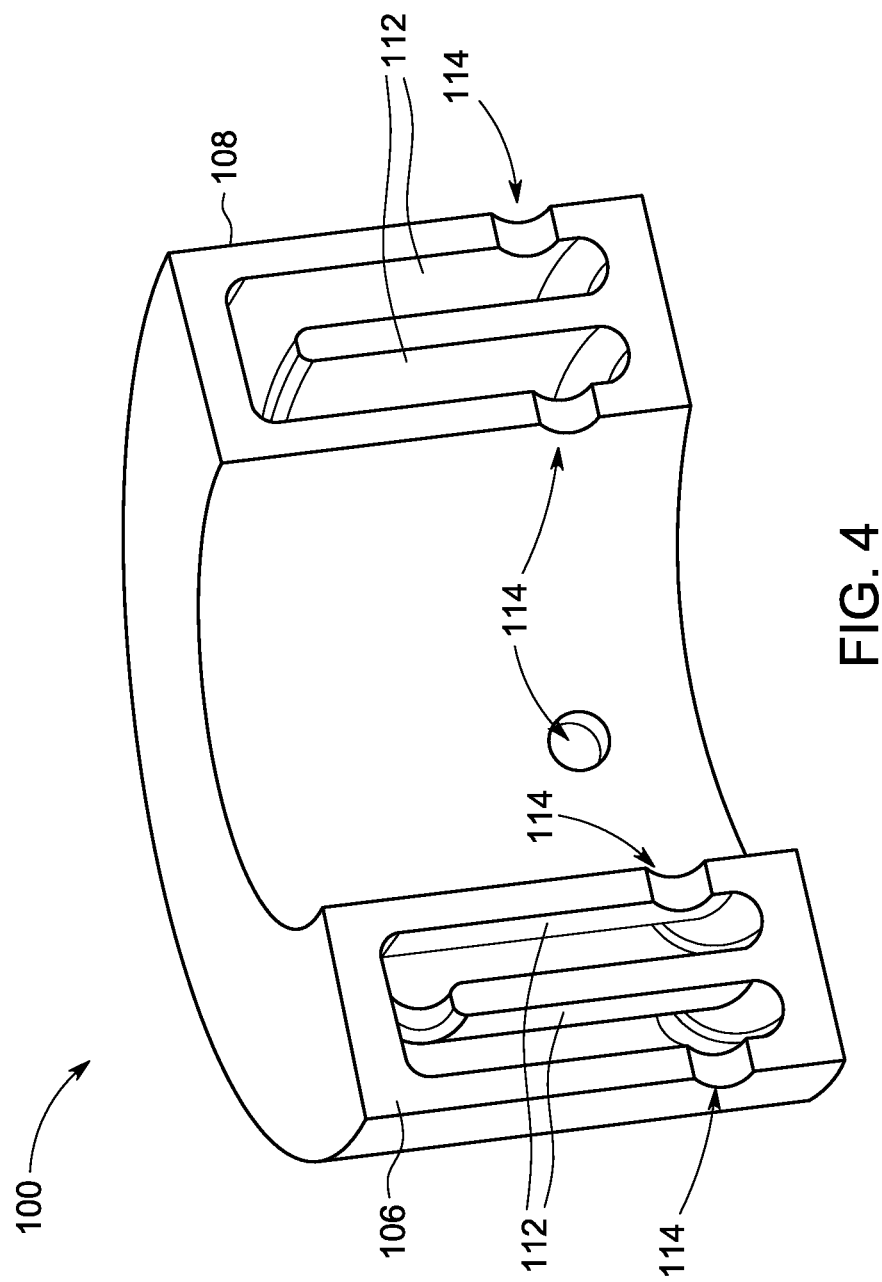
FIG. 4 is a perspective view of the component shown in FIG. 1 after machining by the electrochemical system shown in FIG. 3.

FIG. 3 is a schematic view of an exemplary ECM system 300 used to machine component 100. FIG. 4 is a perspective view of component 100 after machining by ECM system 300. In the exemplary embodiment, prior to ECM, component body portion 106 must be electrically isolated from electrode 116 and anchors 118. To facilitate such isolation, electrically conductive build plate 104 (shown in FIG. 1) is replaced with a non-conductive support plate 302. Body portion 106 is coupled to support plate 302 via bottom surface and electrode 116 and anchors 118 are coupled to support plate 302 via first end 120 of anchors 118. Non-conductive support plate 302 facilitates isolating body portion 106 from electrode 116 and anchors 118 such that an electric current applied within system 300 does not flow through body portion 106 to electrode 116 and anchors 118. In the exemplary embodiment, build plate 104 is covered with a non-conductive material, such as but not limited to an epoxy, and build plate 104 may then be machined away from the epoxy using conventional machining methods.

In the exemplary embodiment, ECM system 300 applies an electromotive force in the form of a pulsed voltage (and more particularly, a bipolar pulsed voltage) to component 100 and electrode 116 to electrochemically remove material from component 100 such that at least inner surface 110 is smoothed. The application of the pulsed voltage to electrode 116 and to component 100 electrochemically removes a predetermined amount of material from inner surfaces 110 of component internal passage 112. The bipolar, pulsed voltage is applied across electrode 116 and component 100 using a power source 304. More specifically, power source 304 includes a positive lead 306 operatively coupled to body portion 106 and a negative lead 308 operatively coupled to electrode 116 to provide a pulsed voltage to electrode 116 and to component body portion 106. As used herein, the phrase "operatively connected" should be understood to mean that the respective components may be connected (for example, mechanically or electrically) directly or may be connected via other components. In one non-limiting example, negative lead 308 may be coupled directly to anchors 118, which are in turn coupled to electrode 116 at anchor second end 122. In the exemplary embodiment, ECM system 300 includes a controller 310 operatively connected to bipolar power source 304 and is configured to perform pulse train control. Controller 310 controls the pulse duration, frequency and voltage of the pulsed voltage supplied to electrode 116 and component 100.

In the exemplary embodiment, ECM system 300 further includes an electrolyte receptacle 312 configured to contain an electrolyte 314. Electrolyte 314 comprises a charge-carrying fluid, such as but not limited to phosphoric acid. Electrolyte receptacle 312 comprises any appropriate non-reactive receptacle. The shape and capacity of receptacle 312 may vary according to the application, as long as receptacle 312 is sized sufficiently to receive electrolyte 314, component 100, electrode 116, anchors 118, and leads 306 and 308. The material of receptacle 312 may also vary as long as it is non-reactive and does not interfere with the ECM process.

Electrolyte 314 is delivered to receptacle 312 in amounts sufficient to submerge at least portions of component 100, electrode 116, and anchors 118. Alternatively, electrolyte 314 may be directly channeled through access ports 114 into internal passage 112. In the exemplary embodiment, electrolyte 314 is stored in an electrolyte source 316 that is in flow communication with internal passage 112 via access ports 114. Electrolyte 314 is delivered into receptacle 312 by any appropriate means. For example, electrolyte 314 may be poured into receptacle 312. Alternatively, electrolyte 314 may be delivered into receptacle 312 by a pumping device 318 that is coupled between receptacle 312 and source 316 via a conduit 320. In the exemplary embodiment, pumping device 318 is a low-pressure pump, which agitates and stirs electrolyte 314 in receptacle 312 such that distribution of electrolyte 314 from a nozzle 322 of pumping device 318 causes a turbulent flow of electrolyte 314 to be channeled through access ports 114 and into internal passage 112.

In the exemplary embodiment, electrode 116 is subject to electromotive force via lead 308 that reacts with electrolyte 314 to cause at least partial dissolution of internal passage inner surfaces 110. Such dissolution results in smoothing of inner surface 110 to provide a high-quality surface finish. Electrolyte 314 carries the metal hydroxide formed during ECM away from component 100 through access ports 114. As described above, component 100 may be a fuel nozzle or any number of hot gas path turbine components that each require a high-quality smooth surface finish for operation. ECM system 300 facilitates applying an electromotive force to electrode 116 to facilitate smoothing inner surface 110 of internal passage 112 without unwanted thermal or mechanical stresses being transferred to component 100.

After inner surface 110 roughness caused by additive manufacturing apparatus (shown in FIG. 2) has been removed using ECM system 300, it may be beneficial to remove electrode 116 from within internal passage 112. Alternatively, electrode 116 may remain within internal passage 112. In the exemplary embodiment, electrode 116 is removed from internal passage 112 by reversing the polarity of bi-polar power source 304 such that negative lead 308 is given a positive charge and positive lead 306 is given a negative charge. Reversing the polarity of leads 306 and 308 facilitates removal of electrode 116 by electromechanically dissolving electrode 116 in a similar manner as electrode 116 facilitated dissolving at least a portion of inner surfaces 110 during the ECM process. As a result, electrode 116 may be completely dissolved or may be partially dissolved such that any remaining pieces of electrode 116 may be removed from internal passage through access ports 114. FIG. 4 illustrates component 100 after removal from ECM system 300. ECM system 300 facilitated the removal of surface roughness from inner surfaces 110 and electrode 116 (shown in FIGS. 1-3) has been removed as described above.

Figure 5:
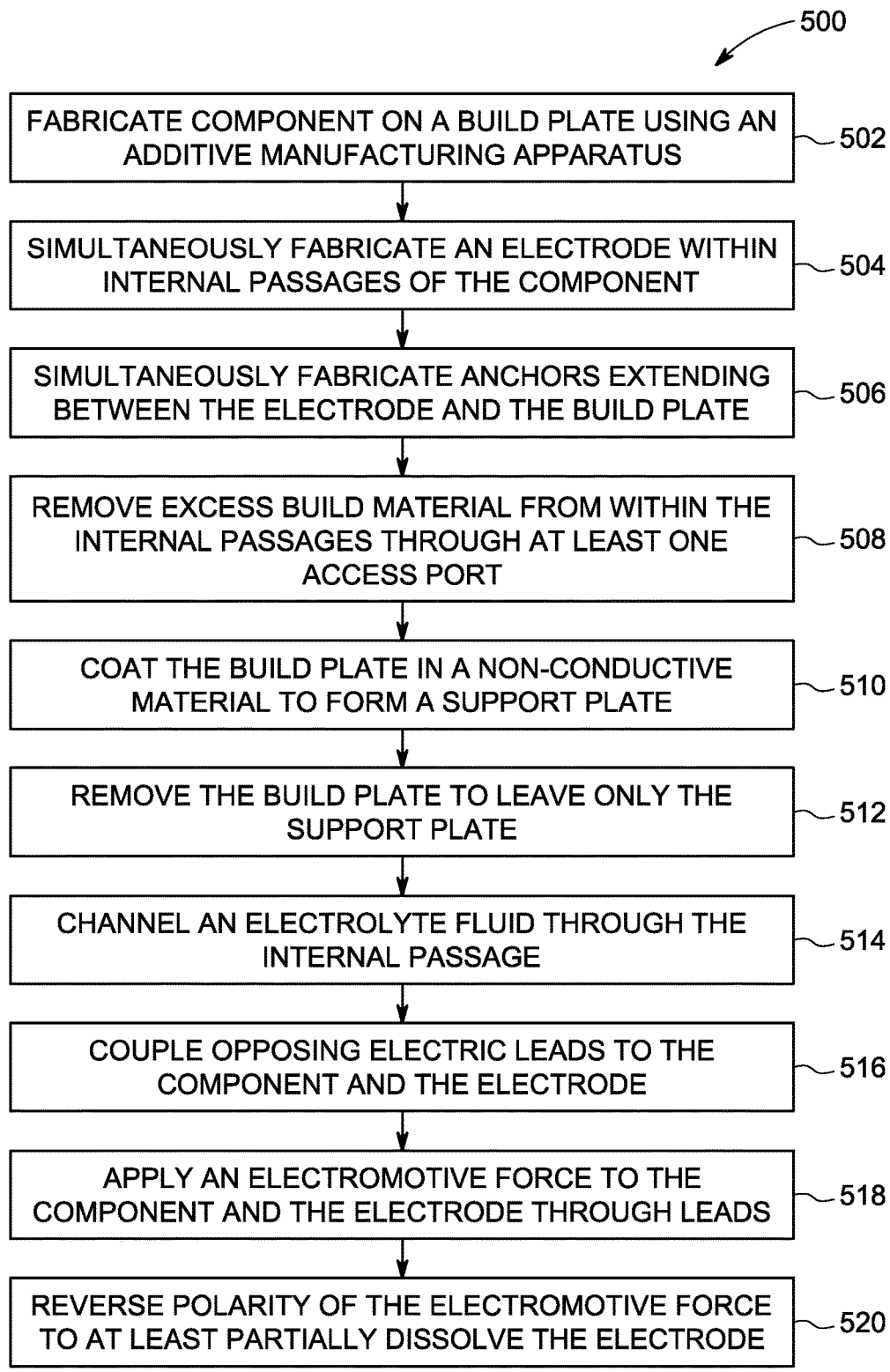
FIG. 5 is a flow chart of an exemplary method of manufacturing the component shown in FIG. 4.

FIG. 5 illustrates an exemplary method 500 for manufacturing component 100 having smoothed inner surfaces 110 (both shown in FIG. 1). Method 500 includes fabricating 502 component 100 on build plate 104 (shown in FIG. 1) from powder 210 (shown in FIG. 2) using an additive manufacturing apparatus 202 (shown in FIG. 2) as described above. Electrode 116 (shown in FIG. 1) is simultaneously fabricated 504 within internal passage 112 (shown in FIG. 1) of component 100 in a layer-by-layer additive manufacturing process described above. Method 500 further includes simultaneously fabricating 506 anchors 118 (shown in FIG. 1) with component 100 and electrode 116. Anchors 118 facilitate supporting electrode 116 within internal passage 112 and are configured to electrically isolate electrode 116 from component 100. Excess powder 210 is then removed 508 from within internal passage 112 through access ports 114 (shown in FIG. 1). Method 500 also includes coating 510 build plate 104 with an electrically non-conductive material, such as an epoxy, and removing 512 build plate 104 leaving behind support plate 302 (shown in FIG. 3). Replacing build plate 104 with support plate 302 serves to further electrically isolate component 100 from electrode 116 and anchors 118 in preparation for electrochemical machining. An electrolyte fluid 314 (shown in FIG. 3) is then channeled 514 into internal passage 112 through access ports 114. Positive and negative electric leads 306 and 308 of power source 304 (all three shown in FIG. 3) are coupled 516 to component 100 and electrode 116, respectively. Power source 304 then applies 518 an electromotive force through leads 306 and 308 to component 100 and electrode 116. The electromotive force flows through electrolyte 314 between component 100 and electrode 116 and is configured to at least partially dissolve a portion of component inner surface 110 to remove surface roughness caused by the additive manufacturing process and provide a smooth inner surface 110 finish. Method 500 also includes reversing 520 the polarity of the electromotive force provided by power source 304 to at least partially dissolve electrode 116 to facilitate removing electrode 116 from within internal passage 112.

The above-described additive manufacturing and ECM systems provide a cost-effective method for improving the surface finish of internal passages of components fabricated by additive manufacturing. The embodiments described herein facilitate the design of new components having built-in electrodes to facilitate time-efficient and cost effective ECM. Specifically, the apparatus, systems, and methods described herein include an additive manufacturing apparatus that simultaneously fabricates a component having internal passages and an electrode within those internal passages that is electrically isolated from the component. Also, the apparatus, systems, and methods described herein include an ECM system that improves the rough surface finish of the internal passages as a result of additive manufacturing by channeling an electrolyte through the internal passages and applying an electromotive force to the component and to the electrode to facilitate removal the internal passage roughness. Moreover, the apparatus, systems, and methods described herein further facilitate removal of the electrode from within the component's internal passages by reversing the polarity of the electromotive force to at least partially dissolve the electrode. The devices, systems, and methods are described herein as applied generally to any component fabricated by additive manufacturing that includes at least one internal passage requiring ECM. More specifically, the devices, systems, and methods described herein may be applied to, without limitation, fuel nozzles used in aircraft engines, fuel injectors used in gas turbine engines, and any component located within a hot gas path such as turbine blades, turbine nozzles, and bearings. Generally, the devices, systems, and methods described herein may be applied to any component where surface finish of an internal passage is critical.

An exemplary technical effect of the systems, methods, and apparatus described herein includes at least one of: (a) simultaneously fabricating an electrode within an internal passage of a component using an additive manufacturing apparatus; (b) applying an electromotive force using an ECM system to the electrode and the component to at least partially dissolve the inner surfaces of the component internal passage to remove surface roughness caused by the additive manufacturing process; and (c) reversing the polarity of the electromotive force to at least partially dissolve the electrode to facilitate removing the electrode from the internal passage.

Exemplary embodiments of methods and systems for electrochemical machining of an additively manufactured component are described above in detail. The additive manufacturing and electrochemical machining are not limited to the specific embodiments described herein, but rather, components of systems and/or steps of the methods may be utilized independently and separately from other components and/or steps described herein. For example, the methods may also be used in combination with other additive manufacturing systems and methods, and are not limited to practice with only the DMLM systems and methods as described herein. Rather, the exemplary embodiment can be implemented and utilized in connection with many other additive manufacturing applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   a component, wherein said component includes an inner surface and at least one internal passage;
   at least one electrode formed within said at least one internal passage and electrically isolated from the component, wherein said component and said at least one electrode are formed using additive manufacturing; and
   a power source operatively connected to said at least one electrode, wherein said power source is configured to apply an electromotive force to facilitate smoothing said inner surface with said electrode.

2. The system according to claim 1 wherein the at least one electrode and the component are formed substantially simultaneously.

3. The system according to claim 1 wherein the power source is operatively connected to said at least one electrode and to said component.

4. The system according to claim 1 wherein the component is coupled to a support plate.

5. The system according to claim 4, wherein said support plate is formed from a non-conductive material electrically isolating the at least one electrode from the component.

6. The system according to claim 4, wherein said support plate further comprises a non-conductive material on at least some portions of the support plate electrically isolating the at least one electrode from the component.

7. The system according to claim 1 further comprising at least one access port through the component and providing access to said at least one internal passage.

8. The system according to claim 7 further comprising at least one anchor coupled between a support plate and said at least one electrode and said anchor extending through said at least one access port.

9. The system according to claim 8, wherein said at least one anchor is formed simultaneously with at least one of said component and said at least one electrode.

10. The system according to claim 8, wherein said at least one anchor is configured to electrically isolate the electrode from the component.

11. The system according to claim 1, wherein a polarity of the electromotive force is reversed to at least partially dissolve said at least one electrode.

12. The system according to claim 1 further comprising an electrolyte fluid source in flow communication with said at least one internal passage.

13. The system according to claim 1, wherein said component and said at least one electrode are formed from the same material.

14. The system according to claim 1, wherein said at least one said electrode is a lattice-structured electrode.

15. The system according to claim 1, wherein the component is formed from a superalloy.

16. A component produced by a process comprising:
    forming the component by additive manufacturing, wherein the component includes an inner surface and at least one internal passage;
    forming at least one electrode by additive manufacturing within the at least one internal passage, wherein the electrode and the internal passage are formed substantially simultaneously;
    electrically isolating the at least one electrode from the component; and
    applying an electromotive force to the at least one electrode to facilitate smoothing the inner surface.

17. The additively manufactured component of claim 16 wherein the at least one electrode is at least partially removed from the internal passage.

18. The additively manufactured component of claim 16 wherein the at least one electrode remains in the internal passage.

19. The additively manufactured component of claim 16 wherein the component is at least partially a superalloy.

20. The additively manufactured component of claim 16 wherein the component comprises one of a fuel nozzle, fuel injector, turbine blade, turbine nozzle, and bearing.

21. The additively manufactured component of claim 16 wherein the component and the at least one electrode are formed from the same material.

* * * * *